Feb. 1, 1966  W. A. BOOTHE  3,232,533
FLUID-OPERATED LOGIC CIRCUIT
Filed Aug. 3, 1964  2 Sheets-Sheet 1

Inventor:
Willis A. Boothe,
by Charles W. Helzer
His Attorney.

Feb. 1, 1966  W. A. BOOTHE  3,232,533
FLUID-OPERATED LOGIC CIRCUIT
Filed Aug. 3, 1964  2 Sheets-Sheet 2

Inventor:
Willis A. Boothe,
by Charles W. Helzer
His Attorney.

United States Patent Office
3,232,533
Patented Feb. 1, 1966

3,232,533
FLUID-OPERATED LOGIC CIRCUIT
Willis A. Boothe, Scotia, N.Y., assignor to General Electric Company, a corporation of New York
Filed Aug. 3, 1964, Ser. No. 386,843
8 Claims. (Cl. 235—200)

My invention relates to a logic circuit for providing signals indicative of the status of deviation of a control system variable from a normal operating range of values thereof, and in particular, to such logic circuit employing fluid control devices for providing such signals in fluid form.

In numerable instances, in all phases of technology, control systems of the closed loop type are employed to regulate a selected condition or control system variable to a desired value thereof. In many of these control systems, it is required that the control system variable be monitored to determine the status of deviation of its value as being within, slightly outside or considerably outside a normal operating range thereof. Under conditions of system operation within the normal operating range, a basic loop of the control system is operable to regulate the selected control system variable. However, in the event that the value of the control system variable falls outside the normal operating range, it is desirable to utilize a logic circuit for generating an override signal which provides a greater change in the control system variable than that normally produced in the basic loop. Illustratively, the selected condition or control system variable may be the magnitude of a rotational velocity such as that of a steam turbine, the liquid level within an enclosed container, or the pressure or temperature of a gas or liquid. In effect, the selected control system variable may comprise any function or condition which can be sensed for measurement by a suitable frequency-sensitive transducer means to provide a signal or other indication of particular values thereof.

Frequently, the region in which the control system variable is to be monitored introduces extreme environmental problems, such as shock, vibration, nuclear radiation and high temperature. Prior art systems, particularly those comprising electronic elements and nonfluid mechanical elements, are incapable of withstanding such extreme environmental conditions and continue performing in a satisfactory manner.

In contradistinction, fluid control devices, especially of the type known as fluid amplifiers, feature reliability and an essentially unlimited life-span since generally they employ neither mechanical moving parts, thereby avoiding frictional wear, nor parts undergoing self-deterioration or dissipation in operation, thereby avoiding a limited life-span such as that experienced in an electron tube due to cathode deterioration. Further, they can be produced at low cost due to their ease of fabrication from virtually any material that is nonporous and has structural rigidity. In addition, the devices may be connected in circuit relationship either by appropriate interconnection of individual devices or by the formation of the devices in interconnected fashion directly in a single piece of material. Fluid control devices are thus particularly ideal for applications wherein conditions of nuclear radiation, high temperature, vibration and mechanical shock may be present.

Two of the basic types of fluid control devices known as fluid amplifiers are generally referred to as the analog and the digital type. In both of these types of fluid control devices, a first fluid (often called a power fluid) is received through a first (power) fluid inlet and formed into a first (power) jet. Similarly, a second fluid (often called a control fluid) is received through second control fluid inlets and formed into second (control) jets directed against one or opposite sides of the first jet for deflecting such jet selectively for reception within one or the other of two fluid receivers. Each of the receivers is formed as an integral portion of a power flow passage, the latter in communication with an associated power fluid outlet on the device. The same or different types of fluid mediums may be employed as the control and power fluids, the fluids including both compressible fluids such as gas and air, and relatively incompressible fluids, such as water and oil.

By appropriate techniques, fluid control devices may be fabricated in a manner to perform various logic functions. Illustratively, both an "exclusive OR" function and an "AND" function may be performed by a "half-adder" fluid control device in which first and second fluid flows are received at first and second fluid inlets. The first and second fluid flows are formed into first and second fluid jets, respectively, which independently and exclusively of each other proceed in the absence of the other to be received in a first receiver. The concurrent presence of both jets, however, effects a mutual interaction causing a joint deflection of the two jets for reception within a second receiver.

Since fluid control devices, especially of the fluid amplifier type, operate satisfactorily in a variety of environmental conditions in which electronic and purely mechanical devices normally fail, there is a need for obtaining control systems, and in particular, the logic circuit above-mentioned comprised of such fluid control devices.

Therefore, one of the principal objects of my invention is to provide a logic circuit employing a fluid as the operating medium.

Another object of my invention is to provide a logic circuit employing a fluid as both the power conducting medium and the controlling medium.

A further object of my invention is to provide a fluid-operated logic circuit employing fluid control devices connected in circuit relationship for indicating the status of deviation of a control system variable from a normal operating range of values thereof.

A still further object of my invention is to employ fluid amplifiers as the fluid control devices in the logic circuit.

Briefly stated, my invention is a new fluid-operated logic circuit for providing a fluid output signal indicative of the status of deviation of a control system variable from a normal operating range of values thereof, that is, indicating whether the deviation is slightly outside or considerably outside the normal operating range. The logic circuit is comprised by resonant sensor means responsive to particular values of the control system variable which values define the normal operating range, a range slightly outside, and a range considerably outside the normal operating range. The resonant sensors, when responsive, supply control fluid flows to a first stage of fluid control devices comprising analog or digital type fluid amplifiers. A second stage of fluid control devices comprising a digital-type fluid amplifier is in communication with the power fluid outlet of selected devices in the first stage. A third stage of fluid control devices comprising a digital-type fluid amplifier is in communication with the power fluid outlet of the second stage fluid control device and a selected device from the first stage. Finally, a fourth stage of fluid control devices in the form of a plurality of digital-type fluid amplifiers is in communication with the power fluid outlets of the third stage device and selected devices of the first stage such that a power fluid flow at a selected power fluid outlet of a first, second, third of fourth slected fluid amplifier of the fourth stage is indicative of the status of deviation of the control system variable as being slightly above, slightly below, considerably above or considerably below, respectively, the normal operating range.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings, wherein:

Diagrammatic representations in top plan of certain basic types of fluid control devices employed in my invention are shown in FIGURES 1-4 and discussed with reference thereto for facilitating an explanation of the detailed schematic form of the fluid-operated logic circuit of my invention shown in FIGURE 5.

Figure 1:
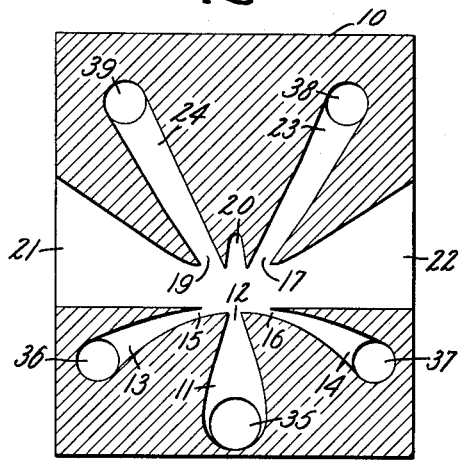
FIGURE 1 is a diagrammatic view in top plan of an analog-type fluid control device.

Referring now to the drawings, in FIGURE 1 there is shown a diagrammatic representation of a momentum exchange type of fluid control device, commonly referred to as an analog-type fluid amplifier. A base member 10 in which the device is formed may be selected from virtually any material that is nonporous, has structural rigidity, and is nonreactive with the fluid medium employed. Illustratively, various plastics may be employed quite advantageously for this purpose, such materials permitting low temperature molding to form the interior channels and passages for the fluid medium. Alternatively, materials adaptable to photoetching processes may be employed, facilitating mass production of the fluid control devices. In addition, metal and other material of a more durable nature may be employed and may be slotted or molded to the desired configuration. A face plate (not shown) is positioned over the base member 10, enclosing various channels and passages to confine the fluid therein; if desired, the face plate may be a transparent material to permit interior inspection of the device. Alternatively, the channels and passages may pass completely through the base member 10 and a face plate provided on both sides thereof. The fluid medium employed may be a compressible fluid such as gases, including air, and relatively incompressible fluids such as water or oil.

The analog amplifier shown in FIGURE 1 includes a power fluid inlet 11 terminating in a fluid flow restrictor forming a nozzle 12 for forming power fluid received therein into a power jet. Control fluid inlets 13 and 14 are provided, terminating in nozzles 15 and 16, respectively, for forming control fluid received therein into control jets directed against the opposite sides of the power jet. Power fluid passage 17 operates as a receiver for receiving the flow of power fluid from the power jet when the latter is deflected by a control jet from nozzle 15. Power flow passage 19 likewise acts as a receiver for receiving the flow of power fluid from the power jet following deflection thereof by a control jet from nozzle 16. The power flow passages 17 and 19 terminating in power fluid outlets 23 and 24, respectively, provide power fluid outputs from the analog fluid amplifier at which there are produced push-pull (complementary) output fluid flows, or single-sided output fluid flows upon one of the outlets being vented. The analog fluid amplifier of FIGURE 1 derives its nomenclature from the proportional increases and decreases effected in the flows of power fluid in power flow passages 17 and 19, one relative to the other, in response to the increases and decreases in the relative magnitudes of the control jets from nozzles 15 and 16, respectively. Although the magnitude of the fluid flow in the control jets is small relative to the flow in the power jet, the transverse direction of impingement of the control jets on the power jet effects the deflection thereof. Thus, the analog-type fluid amplifier provides gain, the change in flows of output power fluid being of increased magnitude relative to the change in flows of the control fluid. Indentation 20 provided intermediate the power flow passages 17 and 19 may be used for venting. Vents 21 and 22 are also provided to equalize ambient pressures on the opposite sides of the jet and to remove excess fluid from the deflection region.

Power fluid inlet 11, control fluid inlets 13 and 14, and power fluid outlets 23 and 24 may be provided, respectively, with conduits 35–39 for interconnection of the respectively associated fluid flow passages (i.e., the fluid inlets and outlets) with other portions of a fluid control system. The conduits 35–39 are represented by circular elements in FIGURE 1 and, illustratively, they comprise cylindrical conduits vertically positioned relative to the plane of the base member 10. Alternatively, slots or channels may be provided in the base member 10 extending to the periphery thereof whereby communication with the various passageways may be had by connection of conduits or other channel-defining members to the peripheral boundaries of the base member 10. The conduits 35–39 may extend vertically to the plane of the fluid control device for a short distance and then are provided with right angle turns to facilitate vertical stacking of two or more of the fluid control devices.

Figure 1A:
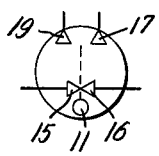

A schematic representation of the analog-type fluid amplifier shown in FIGURE 1 is illustrated in FIGURE 1A.

Figure 2:
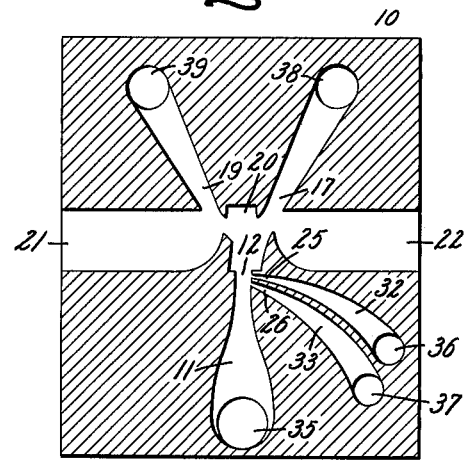
FIGURE 2 is a diagrammatic view in top plan of a monostable digital-type fluid control device.
Figure 3:
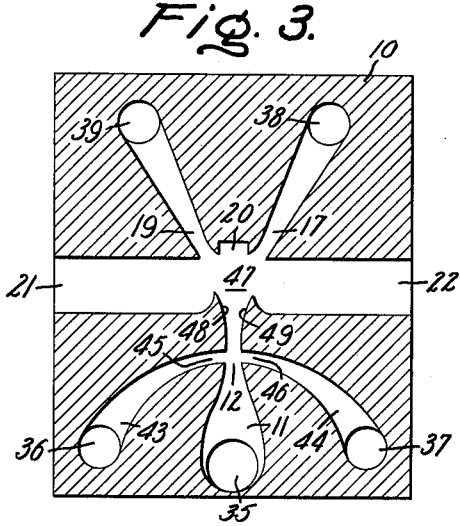
FIGURE 3 is a diagrammatic view in top plan of a bistable digital-type fluid control device.

In FIGURE 2 is shown a diagrammatic representation of a monostable digital-type fluid control device constituting a modification of the more basic fluid control devices shown in FIGURES 1 and 3. The device of FIGURE 2 is monostable in operation, and, although not necessarily of the boundary layer effect type, is a digital fluid control device generating output fluid flows having a square wave form. The monostable digital fluid control device is formed in a base member 10, the material of the latter being selected in accordance with the considerations hereinabove set forth.

The monostable digital fluid control device includes a power fluid inlet 11 and first and second control fluid inlets 32 and 33, the former terminating in a nozzle 12 for forming power fluid received therein into a power fluid jet and the latter terminating in nozzles 25 and 26, respectively, for forming control fluid received therein into control fluid jets directed against the same side of the power jet. In the absence of a control jet from either nozzle 25 or nozzle 26, the power jet from nozzle 12 is directed to be normally received within a first power flow passage 17, the latter acting as a receiver for receiving the flow of power fluid from the power jet and also providing a first power fluid outlet for the device.

A second power flow passage 19 is provided which acts as a receiver for receiving the flow of power fluid from the power jet following the deflection of the latter by a control jet from either, or both, of the nozzles 25 and 26. Power flow passage 19 also provides a second power fluid outlet for the device. Indentation 20, provided intermediate the first and second power flow passages 17 and 19, imparts a vortex action to the power jet to enhance the deflection thereof and to compact the fluid therein to create substantially exclusive flows of power fluid in the selected one of the power flow passages 17 and 19 to which the power jet is deflected. There are further provided vents 21 and 22 which serve to provide passages for removing excess fluid from the region of deflection of the power jet.

As explained with reference to the device of FIGURE 1, the digital fluid control device of FIGURE 2 may be provided with vertical conduits 35–39 or, if desired, channels formed within and extending to the periphery of the base member 10 to provide communication with, respectively, power fluid inlet 11, control fluid inlets 32 and 33, and power flow passages 17 and 19.

Figure 2A:
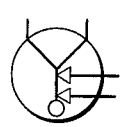

A schematic representation of the digital-type fluid amplifier illustrated in FIGURE 2 is shown in FIGURE 2A.

A more basic type of digital-type fluid amplifier is shown in FIGURE 3. A base member 10 is selected from materials with regard to the same considerations as the base member 10 in FIGURE 1, and the digital fluid control device is formed therein in accordance with the same manufacturing techniques. A power fluid inlet 11 is provided, terminating in nozzle 12 for forming power fluid received therein into a power jet. There are further provided control fluid inlets 43 and 44 terminating in nozzles 45 and 46, respectively, for forming control fluid received therein into control jets directed against opposite sides of the power jet.

The control jets deflect the power jet within interaction chamber 47, the latter being defined by a pair of oppositely disposed side walls 48 and 49 which diverge in the direction of the fluid flow in the power jet. Although the side walls may be designated to obtain momentum exchange or boundary layer action, only boundary layer action will be explained for this digital-type fluid amplifier in order to illustrate its intended function, that of a memory device. Power flow passages 17 and 19 serve as receivers for receiving the flow of power fluid from the power jet following an appropriate deflection thereof, and the terminal ends thereof provide power fluid outlets. Indentation 20, provided intermediate the power flow passages 17 and 19, enhances the deflection of the power jet. Vents 21 and 22 are provided to remove excess fluid from the interaction chamber 47.

In operation, the power jet undergoes an entrainment action with the side walls 48 and 49 creating a low pressure region of trapped fluid between the sides of the power jet and the side walls 48 and 49. The side walls 48 and 49 are designed such that, due to inherent imbalances in the forces acting on the power jet, it will become attached to one or the other, but not both, of the side walls 48 and 49.

The entrainment action is regenerative in effect, the low pressure region of trapped fluid causing the power jet to be deflected more closely to a given one of the side walls 48 and 49 whereby the entrainment action increases in magnitude, effecting a resultant decrease in the pressure of the region of trapped fluid. In this manner, the power jet achieves a stable position of attachment to a given one of the side walls 48 and 49 for a substantial distance along the length thereof. The descriptive terminology of a boundary layer effect type of fluid control device thus arises from the attachment which the power jet experiences with the side walls 48 and 49.

The boundary layer effect type of fluid control device is also referred to as a digital fluid control device in that, when in one of the attached portions, the flow of power fluid is confined almost exclusively to the corresponding one of the power flow passages 17 and 19. Indentation 20, by imparting a vortex flow to the power jet, not only enhances the deflection thereof but also compacts the fluid flow therein to provide the substantially exclusive flow of power fluid within one or the other of the power flow passages 17 and 19. Illustratively, when the power jet is attached to side wall 48, a substantially exclusive flow of power fluid will be created in power flow passage 19, to the exclusion of flow in power flow passage 17.

To switch the power jet for creating a flow of power fluid in power flow passage 17, a control jet from nozzle 45 is formed and directed against the power jet. Without such latter control jet, the power jet remains attached to side wall 48 and a memory function is thereby obtained. The control fluid introduced by the control jet increases the pressure in the region of trapped fluid intermediate the power jet and side wall 48 and overcomes the entrainment action, progressively detaching the power jet from side wall 48. The control jet further acts to deflect the power jet toward side wall 49 to which it subsequently becomes attached by the entrainment process. Thus, there is created a flow of power fluid in power flow passage 17, substantially to the exclusion of flow in power flow passage 19. By directing a control jet from nozzle 46 against the power jet when the latter is attached to side wall 49, the power jet may be detached from side wall 49 and deflected to effect a subsequent attachment to side wall 48, thereby switching the exclusive flow of power fluid to power flow passage 19. Hence, the output flows created by the flows of power fluid in power flow passages 17 and 19 are of a push-pull (complementary) nature, or single-sided upon one of the outlets being vented, and, due to the rapid switching therebetween, are substantially of square wave form.

As explained with reference to the devices of FIGURES 1 and 2, the digital fluid control device of FIGURE 3 may be provided with vertical conduits 35–39, or, if desired, channels formed within and extending to the periphery of the base member 10 to provide communication with, respectively, power fluid inlet 11, control fluid inlets 43 and 44, and power flow passages 17 and 19.

Figure 3A:
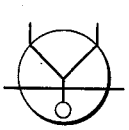

A schematic representation of the digital type fluid amplifier of FIGURE 3 is illustrated in FIGURE 3A.

Figure 4:
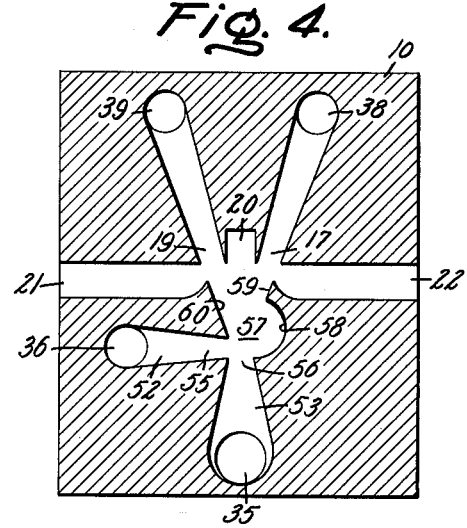
FIGURE 4 is a diagrammatic view in top plan of a second type of bistable-type fluid control device.

In FIGURE 4, there is shown a diagrammatic representation of a third type of digital-type fluid amplifier. This particular fluid amplifier is a bistable type generating output fluid flows having a square wave form and may be described as a half-adder device. The half-adder fluid control device includes first and second fluid inlets 52 and 53 terminating in nozzles 55 and 56, respectively, the nozzles 55 and 56 forming jets directed into an interaction chamber 57. The interaction chamber 57 is further defined by an arcuate wall 58, a lip member 59 and an oppositely disposed lip member 60, the lip members 59 and 60 being generally aligned with power flow passages 17 and 19, respectively.

A flow of fluid received in fluid inlet 53 is formed into a fluid jet by nozzle 56, the fluid jet proceeding through interaction chamber 57 and along the lip member 60 to be received within power flow passage 19; similarly, a flow of fluid received in fluid inlet 52 is formed into a fluid jet by nozzle 55 and directed by arcuate wall 58 to be received within power flow passage 19. When the fluid inlets 52 and 53 simultaneously receive flows of fluid, the fluid jets formed by the nozzles 55 and 56, respectively, interact in interaction chamber 57 and are directed along lip member 59 to be received within power flow passage 17. Indentation 20 provided intermediate the power flow passages 17 and 19 imparts a vortex action to the fluid flow to enhance the deflection thereof. Vents 21 and 22 communicate with interaction chamber 57 and the ambient atmosphere, as in the case of the devices of FIGURES 1–3, to provide passages for removing excess fluid therefrom.

Thus, it may be seen that the half-adder fluid control device of FIGURE 4 can perform both an "exclusive OR" and an "AND" logic function. As an example, the fluid jets formed by nozzles 55 and 56, independently and exclusively of each other, proceed in the absence of the other to be received in receiver 19, that is, an exclusive OR logic function is obtained. The concurrent presence of both jets, however, effects a mutual interaction within chamber 57 causing a joint deflection of the two jets for reception within receiver 17, that is, obtaining an AND logic function.

Figure 4A:
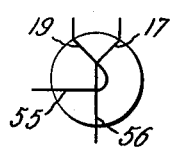

A schematic representation of the digital type fluid amplifier of FIGURE 4 is illustrated in FIGURE 4A.

Figure 5A:
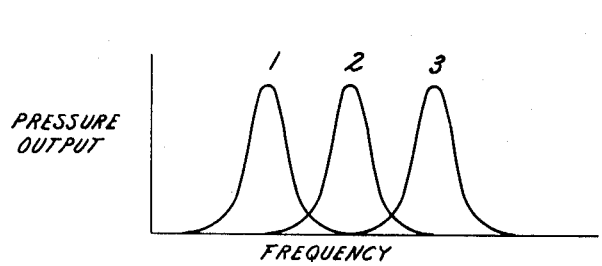
FIGURE 5 is a schematic representation of a fluid-operated logic circuit constructed in accordance with my invention.
Figure 5:
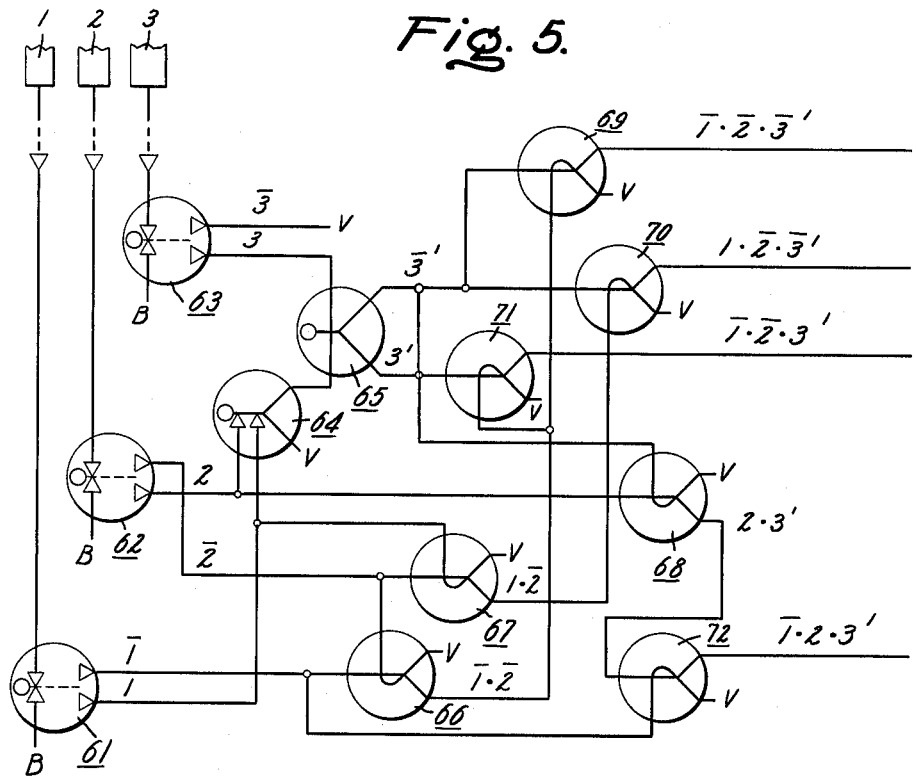

In FIGURE 5 there is shown a schematic representation of a fluid-operated logic circuit constructed in accordance with my invention. The particular logic circuit illustrated in FIGURE 5 is employed for the specific purpose of providing fluid signals indicative of the status of deviation of a control system variable from a normal operating range of values thereof. The logic circuit shown in FIGURE 5 finds application in many control systems which are designed to regulate a selected condition or control system variable to a desired value thereof, and will be described with specific reference to a speed control system for a steam turbine. Thus, a basic control system loop controls the operation of a turbine steam valve cylinder while the turbine speed is within a normal operating range thereof. However, in the event that the turbine speed falls outside the normal operating range, whether merely slightly outside the range or considerably outside the range, a second control system loop having a higher gain than the basic loop is made operative. This second control system loop then dominates the overall control system regulating action until such time that the selected control system variable is again within the normal operating range. The second control system loop causes a greater change in the position of the steam valve, resulting in a slow acceleration or deceleration being demanded if the turbine speed is merely slightly outside the normal operating range, and a high acceleration or deceleration if such speed is considerably outside the normal operating range. The second control system loop is made operative by a signal which may be described as an override signal. Such override signal is generated by a logic circuit which circuit will now be described with relation to FIGURE 5.

The control system variable, turbine speed in this case, is sensed by means of three transducers of the resonant sensor type designated by numerals 1, 2 and 3. The resonant sensors are of a type responsive to a frequency of vibration or rotation, as in this case, and may comprise vibrating reeds, Helmholtz resonators, tuning forks and other spring mass devices which provide a fluid output signal wherein the frequency-pressure distribution thereof is as illustrated in FIGURE 5A. For the particular application, as here, wherein a normal operating range and an operating range slightly outside thereof are to be sensed, resonant sensors 1 and 2 are tuned to the lower and upper limit of the normal operating range, respectively, and resonant sensor 3 is tuned to a higher frequency defining a value of the control system variable considerably higher than the normal operating range.

The fluid output of resonant sensor means 1, 2 and 3 are of an analog nature, and the fluid outlets thereof are connected in fluid communication with a first stage of fluid control devices, that is, with each of the control fluid inlets of corresponding analog-type fluid control devices 61, 62 and 63, respectively.

It should be understood that the first stage of fluid control devices may also be digital-type fluid amplifiers of the type illustrated in FIGURE 3, but being distinguished in that they provide no memory function. The memory function is obtained by designing the side walls of the interaction chamber 47 of sufficient length and preferably providing additional restrictions in the control fluid inlets 43, 44. Thus, the device illustrated in FIGURE 3 may be employed in the first stage by designing the side walls sufficiently short and avoiding additional restrictions in the control fluid inlets. The output fluid flows in such latter case are also of square wave form. The fluid control devices comprising the first stage are illustrated in FIGURE 5 as analog-type merely to illustrate the different varieties of devices which may be employed, and are not intended as a limitation of my invention.

The interconnecting means between the resonant sensors and the control fluid inlets may comprise any type of fluid containing passage such as the conduits 36 or 37 hereinabove described. Fluid control devices 61, 62 and 63 are analog-type (or digital-type as just mentioned) fluid amplifiers of the type illustrated in FIGURE 1, having the second control fluid inlets thereof connected to a source of fluid often called a bias fluid, illustrated by the letter B at such second control fluid inlets. Thus, in the absence of fluid signals from the resonant sensors, devices 61, 62, 63 have their power fluid flows received substantially exclusively in the power fluid outlets designated $\bar{1}$, $\bar{2}$, $\bar{3}$, respectively, wherein the bar (—) above the number is the logic "NOT" notation. However, in the presence of fluid signals from one or two frequency adjacent resonant sensors, the corresponding fluid control devices have their power fluid flows distributed proportionally between their respective power fluid outlets as determined by the value of the control system variable at such time. Thus, if the turbine speed is approximately at the lower end of its normal operating range, device 61 supplies substantially all of its power fluid flow to power fluid outlet 1. Alternatively, if the speed is somewhat below the normal operating range or approximately midway therein, the power fluid is distributed between both power fluid outlets of the corresponding device 61 or devices 61, 62, respectively, in the case of analog amplifiers only. The first stage fluid control devices thus generate fluid signals indicative of the status of the fluid signals generated by the resonant sensors, and thus the status of the control system variable. The two devices 61, 62 which are responsive to the normal operating range resonant sensors 1 and 2, respectively, have each of their power fluid outlets in fluid communication with additional fluid amplifiers. Fluid amplifier 63, however, has only one of its power fluid outlets in communication with an additional fluid amplifier, such particular power fluid outlet, designated by numeral 3, being the one responsive to an output from resonant sensor 3 which defines a value of the control system variable considerably higher than the normal operating range. The second power fluid outlet of device 63, designated $\bar{3}$, is vented to the atmosphere, such venting designated by the letter V.

The first stage of fluid control devices is in communication with a second stage of fluid control devices comprising a monostable digital-type fluid amplifier 64 such as illustrated in FIGURE 2 for providing a logic OR function. The interconnection of the first and second stage fluid control devices is such that power fluid flow in the nonvented power fluid outlet of device 64 is indicative of the status of the control system variable as being within or slightly outside a normal operating range of values thereof. To obtain this logic function, the first and second control fluid inlets of the digital-type fluid control device 64 are connected to the power fluid outlets designated 1 and 2, respectively, of first stage devices 61 and 62. The first stage power fluid flows when deflected into power fluid outlets 1 and 2 thereof thus providing the control fluid supplying the control fluid inlet(s) of device 64 thereby switching the power fluid flow therein from the vented (V) power fluid outlet to a power fluid outlet in communication with a control fluid inlet of a fluid control device 65 comprising a third stage of fluid control devices.

A third stage of fluid control devices comprising a digital-type fluid amplifier 65 of the boundary layer type such as illustrated in FIGURE 3 is adapted to provide a memory function indicative of the status of the control system variable as being considerably outside and higher than the normal operating range thereof. A first control fluid inlet of memory device 65 is in communication with the nonvented power fluid outlet of fluid control device 64, and a second control fluid inlet is in communication with the nonvented power fluid outlet of fluid control device 63. The two power fluid outlets of device 65 are designated 3' and $\bar{3}'$ wherein the primes designate the fact that the third stage power fluid outlets are modified by the second stage fluid control device 64. A power fluid flow at power fluid outlet 3′ indicates that the control system variable is, or has been, at a value primarily within the frequency response of resonant sensor 3 and remains considerably above the normal operating range thereof.

A fourth stage of fluid control devices is comprised by a plurality of bistable digital-type fluid amplifiers of the half-adder type illustrated in FIGURE 4 for providing an AND logic function. In the particular embodiment illustrated in FIGURE 5, the plurality of fourth stage fluid control devices comprises seven half-adder devices. The fourth stage fluid control devices are in communication with the first and third stage of devices and are interconnected in the following manner. A first fluid control device 66 of the fourth stage has a first fluid inlet thereof in communication with the $\bar{1}$ power fluid outlet of device 61 of the first stage. A second fluid inlet of device 66 is in communication with the power fluid outlet designated $\bar{2}$ of device 62 of the first stage. The nonvented power fluid outlet of device 66 may therefore be designated in logic notation as $\bar{1}\cdot\bar{2}$ wherein the dot sign ($\cdot$) indicates the logic AND function. A second device 67 of the fourth stage has a first fluid inlet in communication with the power fluid outlet designated $\bar{2}$ of device 62 of the first stage and a second fluid inlet in communication with the power fluid outlet designated 1 of device 61 of the first stage. The nonvented power fluid outlet of device 67 may therefore be represented in logic notation as $1\cdot\bar{2}$. A third fluid control device 68 of the fourth stage has a first fluid inlet in communication with the power fluid outlet designated 2 of device 62 of the first stage and a second fluid inlet in communication with the power fluid outlet designated 3′ of device 65 of the third stage. The nonvented power fluid outlet of half-adder 68 is thus designated in logic nomenclature as $2\cdot3'$.

The first three half-adder devices 66, 67 and 68 heretofore described provide the intermediate logic necessary to obtain the logic provided by the fourth, fifth, sixth and seventh fluid control devices of the fourth stage, such latter logic determining the status of deviation of the control system variable as being slightly above or below or considerably above or below the normal operating range. A fourth half-adder 69 of the fourth stage has a first fluid inlet in communication with the power fluid outlet designated $\bar{3}'$ of device 65 of the third stage and a second fluid inlet in communication with the nonvented power fluid outlet of half-adder 66 designated $\bar{1}\cdot\bar{2}$. The nonvented power fluid outlet of fluid control device 69 provides a fluid output signal having the logic notation $\bar{1}\cdot\bar{2}\cdot\bar{3}'$. The fifth fluid control device 70 in the fourth stage has a first fluid inlet in communication with the power fluid outlet of device 65 of the third stage designated $\bar{3}'$ and a second fluid inlet in communication with the power fluid outlet of device 67 of the fourth stage designated as $1\cdot\bar{2}$. The nonvented power fluid outlet of device 70 provides a fluid output signal having the logic notation $1\cdot\bar{2}\cdot\bar{3}'$. A sixth fluid control device in the form of half-adder 71 has a first fluid inlet in communication with the power fluid outlet of device 65 of the third stage designated as 3′ and a second fluid inlet in communication with the power fluid outlet of device 66 of the fourth stage designated $\bar{1}\cdot\bar{2}$. The nonvented power fluid outlet of device 71 provides fluid output signal having the logic designation $\bar{1}\cdot\bar{2}\cdot3'$. The seventh fluid control device of the fourth stage is a half-adder 72 having a first fluid inlet in communication with the power fluid outlet of device 68 of the fourth stage designated $2\cdot3'$ and a second fluid inlet in communication with the power fluid outlet of device 61 of the first stage designated $\bar{1}$. The nonvented power fluid outlet of device 72 provides a fluid output signal having the logic designation $\bar{1}\cdot2\cdot3'$.

It may thus be seen that the logic circuit described in FIGURE 5 of the drawings generates fluid output signals which are indicative of the status of deviation of a control system variable as being slightly outside or considerably outside the normal operating range of values thereof. The operation of the logic circuit may be described in the following manner. Assume the condition wherein a control system variable, such as turbine speed, is within a normal operating range. Under these conditions, resonant sensors 1 and 2 are each responsive to a degree sufficient to overcome the bias control fluid inlet flows supplied to fluid control type devices 61 and 62 whereby the power fluid flow at the power fluid outlets of devices 61 and 62 is characterized by flows having the logic notations 1 and 2, respectively. The power fluid outlets of the devices 61 and 62 being in communication with the control fluid inlets of device 64 thereby supply control fluid thereto such that device 64 switches the power fluid flowing therein from the vented power fluid outlet to the nonvented power fluid outlet and thence to a control fluid inlet of device 65. Resonant sensor 3, not being responsive at this time, supplies its power fluid flow to the vented power fluid outlet $\bar{3}$ thereof. It can be seen that the half-adder devices 69 and 70 each have one of their fluid inlets supplied with fluid flow designated by logic notation $\bar{3}'$ but no fluid flow is supplied to the second fluid inlets of such latter devices. Therefore, the power fluid flows in devices 69 and 70 are each supplied to the vented power fluid outlets and thus no fluid output signals are generated at the outputs of devices 69 and 70 designated as $\bar{1}\cdot\bar{2}\cdot\bar{3}'$ and $1\cdot\bar{2}\cdot\bar{3}'$, respectively. In like manner, it can be seen that half-adder devices 67 and 68 have fluid flow being supplied to only one of the two fluid inlets thereto and thus devices 67 and 68 have their power fluid supplied to the vented power fluid outlets. Finally, half-adders 66, 71 and 72 are provided with no fluid flows to any of their fluid inlets so that there can be no fluid flow present in the nonvented power fluid outlets thereof. Thus, none of the half-adder devices 69, 70, 71 and 72 provides a fluid output signal and thus the logic circuit indicates that the control system variable is within its normal operating range.

In the event that the control system variable is slightly below the normal operating range, but within the frequency response of sensor 1, resonant sensor 1 provides an output but resonant sensor 2 does not. In this case, the logic circuit provides a fluid output signal having the logic notation $1\cdot\bar{2}\cdot\bar{3}'$ at the nonvented power fluid outlet of half-adder device 70. In the example of a turbine speed control, the logic herein provided generates an override signal operable in the overall speed control system to demand a slow acceleration of the turbine.

In the event that the control system variable is slightly higher than the normal operating range, and within the frequency response of sensor 2 only, resonant sensor 2 provides an output but sensors 1 and 3 do not. Under these conditions, the logic circuit provides a fluid output signal having the logic notation $\bar{1}\cdot2\cdot\bar{3}'$ at the nonvented power fluid outlet of half-adder device 72. Again in the example of a turbine speed control, such logic generates an override signal demanding a slow deceleration of the turbine.

In the event that the control system variable activates sensor 3, that is, turbine speed is considerably higher than the normal operating range, sensor 3 alone provides an output. Under these conditions, the logic circuit provides a fluid output signal $\bar{1}\cdot\bar{2}\cdot3'$ at the nonvented power fluid outlet of device 71, thus generating an override signal demanding a high deceleration of the turbine. Since it is possible in a drastic malfunction of a turbine for it to accelerate to a speed well above the resonance of sensor 3, memory device 65 is provided for any signal generated by sensor 3. Thus, once sensor 3 is activated, the logic circuit provides a fluid output signal $\bar{1}\cdot\bar{2}\cdot3'$ which is maintained until the turbine speed reduces to be in the resonant range of sensors 1 and/or 2.

If none of the sensors 1, 2, 3 are activated, the logic circuit senses that the control system variable is considerably below the normal operating range, in the absence of memory device 65 having responded to an overspeed. Under these conditions, the logic circuit provides a fluid output signal $\bar{1}\cdot\bar{2}\cdot\bar{3}'$ at the nonvented power fluid outlet of device 69, thus generating an override signal demanding a high acceleration of the turbine.

It should be apparent that the circuit of FIGURE 5 may be simplified in the event that the control system variable cannot vary over the extreme ranges heretofore described. Thus, if the control system variable cannot increase to a value considerably higher than the normal operating range, the logic circuit portion including half-adder device 71 and memory device 65 may be omitted.

Having described a new fluid-operated logic circuit for providing an override signal indicative of the status of a control system variable as being slightly outside or considerably outside a normal operating range thereof, it is believed obvious that modifications and variations of my invention are possible in light of the above teachings. In order to obtain a more positive switching of the power fluid with analog-type fluid amplifiers, buffer amplifiers of the digital nonmemory type described with relation to the stage one devices may be employed intermediate the stage one and stage two devices when employing analog amplifiers in the first stage. It is therefore, to be understood that changes may be made in the particular embodiment of my invention described which are within the full intended scope of the invention as defined by the following claims.

What I claim as new and desire to secure by Letters Patent of the United States is:

1. A logic circuit for providing a fluid output signal indicative of the status of deviation of a control system variable from a normal operating range of values thereof comprising means for generating first fluid control signals responsive to particular values of a control system variable, first fluid control device means in communication with said first fluid control signal generating means for generating second fluid control signals indicative of the status of the first fluid control signals, second fluid control device means in communication with said first fluid control device means for generating a third fluid control signal indicative of the status of the control system variable as being within or slightly outside a normal operating range of values thereof, third fluid control device means in communication with said first and second fluid control device means for providing a memory function indicative of the status of the control system variable as being considerably outside the normal operating range, and fourth fluid control device means in communication with said first and third fluid control device means for generating a fluid output signal indicative of the status of deviation of the control system variable as being slightly or considerably outside the normal operating range.

2. A logic circuit for providing a fluid output signal indicative of the status of deviation of a control system variable from a normal operating range of values thereof comprising resonant sensor means for generating first fluid control signals responsive to particular values of a control system variable, first fluid control device means in communication with said resonant sensor means for generating second fluid control signals indicative of the status of the first fluid control signals, second fluid control device means in communication with said first fluid control device means for generating a third fluid control signal in the presence of at least one of selected first fluid control signals indicative of the status of the control system variable as being within or slightly outside a normal operating range of values thereof, third fluid control device means in communication with said first and second fluid control device means for providing a memory function indicative of the status of the control system variable as being considerably outside the normal operating range, and fourth fluid control device means in communication with said first and third fluid control device means for generating a fluid output signal indicative of the status of deviation of the control system variable as being slightly or considerably outside the normal operating range.

3. A fluid-operated logic circuit for providing a fluid output signal indicative of the status of deviation of a control system variable from a normal operating range of values thereof comprising a plurality of resonant sensor means for generating first fluid control signals responsive to particular values of a control system variable defining the limits of a normal operating range thereof and an operating point considerably outside the normal operating range, first fluid control device means equal in number to said plurality of resonant sensor means, each first fluid control device means in communication with a corresponding resonant sensor means for generating second fluid control signals indicative of the status of the first fluid control signals, second fluid control device means in communication with said first fluid control device means for generating a third fluid control signal in the presence of at least one of selected first fluid control signals indicative of the status of the control system variable as being within or slightly outside the normal operating range, third fluid control device means in communication with said first and second fluid control device means for providing a memory function indicative of the status of the control system variable as being considerably outside the normal operating range, and fourth fluid control device means in communication with said first and third fluid control device means for generating a fluid output signal indicative of the status of deviation of the control system variable as being slightly above or below, or considerably above or below the normal operating range.

4. In a control system a fluid amplifier logic circuit for providing a fluid output signal indicative of the status of deviation of a control system variable from a normal operating range of values thereof comprising a plurality of resonant sensor means for generating first fluid control signals responsive to particular values of a control system variable defining the limits of a normal operating range thereof and an operating point considerably outside the normal operating range, first fluid amplifier means comprising a plurality of fluid amplifiers equal in number to said plurality of resonant sensor means, each fluid amplifier in communication with a corresponding resonant sensor means for generating second fluid control signals indicative of the status of the first fluid control signals, second fluid amplifier means comprising a digital-type fluid amplifier in communication with said first fluid amplifier means for generating a third fluid control signal indicative of the status of the control system variable as being within or slightly outside the normal operating range, and third fluid amplifier means comprising a digital-type fluid amplifier in communication with said first and second fluid amplifier means for providing a memory function indicative of the status of the control system variable as being considerably outside the normal operating range, and fourth fluid amplifier means comprising a plurality of digital-type fluid amplifiers in communication with said first and third fluid amplifier means for generating a fluid output signal indicative of the status of deviation of the control system variable as being slightly outside or considerably outside the normal operating range.

5. In a control system a fluid amplifier logic circuit for providing a fluid output signal indicative of the status of deviation of a control system variable from a normal operating range of values thereof comprising a plurality of resonant sensor means for generating first fluid control signals responsive to particular values of a control system variable defining the limits of a normal operating range thereof and an operating point considerably outside the normal operating range, first fluid amplifier means comprising a plurality of fluid amplifiers equal in number to said plurality of resonant sensor means, each fluid amplifier in communication with a corresponding resonant sensor means for generating second fluid control signals indicative of the status of the first fluid control signals, second fluid amplifier means comprising a digital-type fluid amplifier in communication with two selected fluid amplifiers of said first fluid amplifier means which define the limits of the normal operating range for generating a third fluid control signal indicative of the status of the control system variable as being within or slightly outside the normal operating range, third fluid amplifier means comprising a digital-type fluid amplifier in communication with said second fluid amplifier means and a selected fluid amplifier of said first fluid amplifier means which defines an operating point considerably outside the normal operating range for providing a memory function indicative of the status of the control system variable as being considerably outside the normal operating range, and fourth fluid amplifier means comprising a plurality of digital-type fluid amplifiers in communication with said first and third fluid amplifier means for generating a fluid output signal indicative of the status of deviation of the control system variable as being slightly outside or considerably outside the normal operating range.

6. In a control system a fluid amplifier logic circuit for providing a fluid output signal indicative of the status of deviation of a control system variable from a normal operating range of values thereof comprising three resonant sensor means for generating three first fluid control signals responsive to particular values of a control system variable defining the limits of a normal operating range thereof and an operating point considerably outside the normal operating range, first fluid amplifier means comprising three analog-type fluid amplifiers, each fluid amplifier in communication with a corresponding resonant sensor means for generating second fluid control signals indicative of the status of the three first fluid control signals, second fluid amplifier means comprising a digital-type fluid amplifier in communication with two selected fluid amplifiers of said first fluid amplifier means which define the limits of the normal operating range for generating a third fluid control signal indicative of the status of the control system variable as being within or slightly outside the normal operating range, third fluid amplifier means comprising a digital-type fluid amplifier in communication with said second fluid amplifier means and the third fluid amplifier of said first fluid amplifier means for providing a memory function indicative of the status of the control system variable as being considerably outside the normal operating range, and fourth fluid amplifier means comprising a plurality of digital-type fluid amplifiers in direct communication with said third fluid amplifier means and said two selected fluid amplifiers of said first fluid amplifier means for generating a fluid output signal indicative of the status of deviation of the control system variable as being slightly outside or considerably outside the normal operating range.

7. In a control system a fluid amplifier logic circuit for providing a fluid output signal indicative of the status of deviation of a control system variable from a normal operating range of values thereof comprising three resonant sensor means for generating three first fluid control signals responsive to particular values of a control system variable wherein a first two of the three fluid signals define the limits of a normal operating range thereof and the third fluid signal defines an operating point considerably outside the normal operating range, first fluid amplifier means comprising three digital-type fluid amplifiers, each fluid amplifier in communication with a corresponding resonant sensor means for generating second fluid control signals indicative of the status of the three first fluid control signals whereby the second fluid signals generated by a first two of said first fluid amplifier means define the limits of the normal operating range, second fluid amplifier means comprising a digital-type fluid amplifier in communication with said first two of said first fluid amplifier means for generating a third fluid control signal indicative of the status of the control system variable as being within or slightly outside the normal operating range, third fluid amplifier means comprising a digital-type fluid amplifier in communication with said second fluid amplifier means and the third fluid amplifier of said first fluid amplifier means for providing a memory function indicative of the status of the control system variable as being considerably outside the normal operating range, and fourth fluid amplifier means comprising seven digital-type fluid amplifiers, said fourth fluid amplifier means in communication with said third fluid amplifier means and said first two of said first fluid amplifier means for generating a fluid output signal indicative of the status of the deviation of the control system variable as being slightly outside or considerably outside the normal operating range.

8. A fluid-operated logic circuit for providing a fluid output signal indicative of the status of deviation of a control system variable from a normal operating range of values thereof comprising three resonant sensor means for generating three first fluid control signals responsive to particular values of a control system variable wherein a first two of the three fluid signals define the limits of a normal operating range of the control system variable and the third fluid signal defines an operating point considerably outside the normal operating range, a first stage of fluid control devices comprising three fluid control devices, each said first stage control device provided with a power fluid inlet, a control fluid inlet, and two power fluid outlets, each control fluid inlet in communication with a corresponding resonant sensor means, a second stage of fluid control devices comprising one fluid control device provided with a power fluid inlet, two control fluid inlets, and two power fluid outlets, the latter said control fluid inlets in communication with one each of the power fluid outlets of a first and second of said first stage control devices, a third stage of fluid control devices comprising one fluid control device having a power fluid inlet, two control fluid inlets and two power fluid outlets, the latter said control fluid inlets in communication with a power fluid outlet of a third of said first stage control devices and a power fluid outlet of said second stage control device, and a fourth stage of fluid control devices comprising seven fluid control devices, each said latter device having first and second fluid inlets and at least one power fluid outlet, selected fluid inlets of selected of said devices comprising the fourth stage in communication with said power fluid outlets of the device of said third stage, further selected devices of said fourth stage having fluid inlets in communication with the power fluid outlets of the second device of said first stage, and still further selected devices of said fourth stage having fluid inlets in communication with the power fluid outlets of the first device of said first stage, four of said fourth stage fluid control devices adapted to selectively generate fluid output signals indicative of the status of deviation of the control system variable as being slightly outside or considerably outside the normal operating range.

References Cited by the Examiner
UNITED STATES PATENTS

| | | | |
|---|---|---|---|
| 2,729,751 | 1/1956 | Westman | 322—32 |
| 2,879,467 | 3/1959 | Stern | 322—22 |

LEO SMILOW, *Primary Examiner.*